Patented Oct. 22, 1929

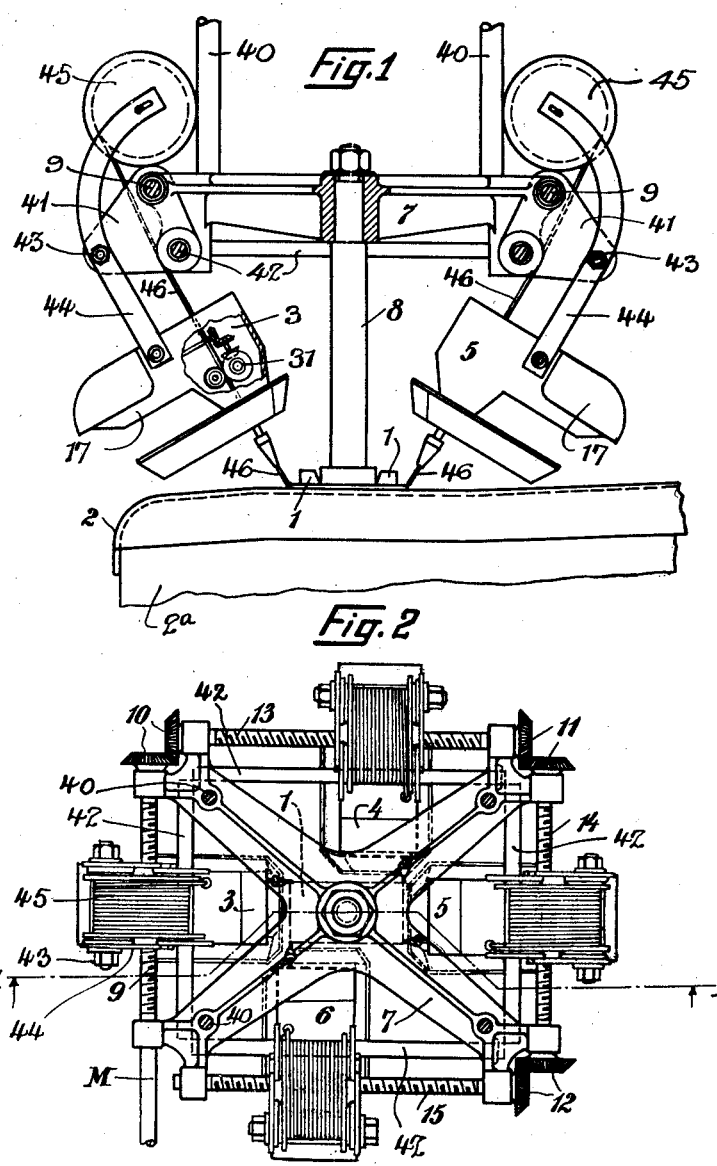

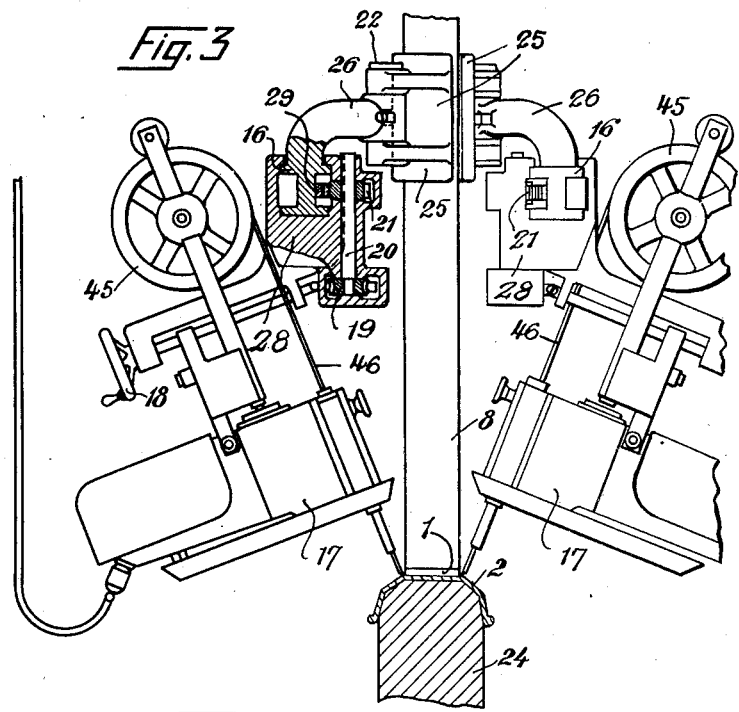
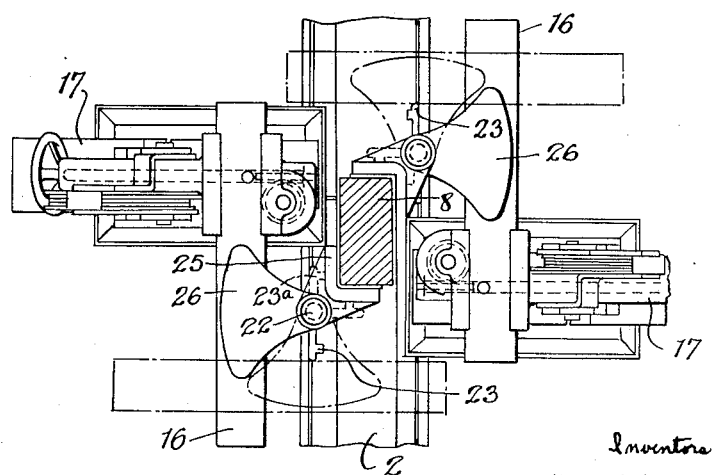

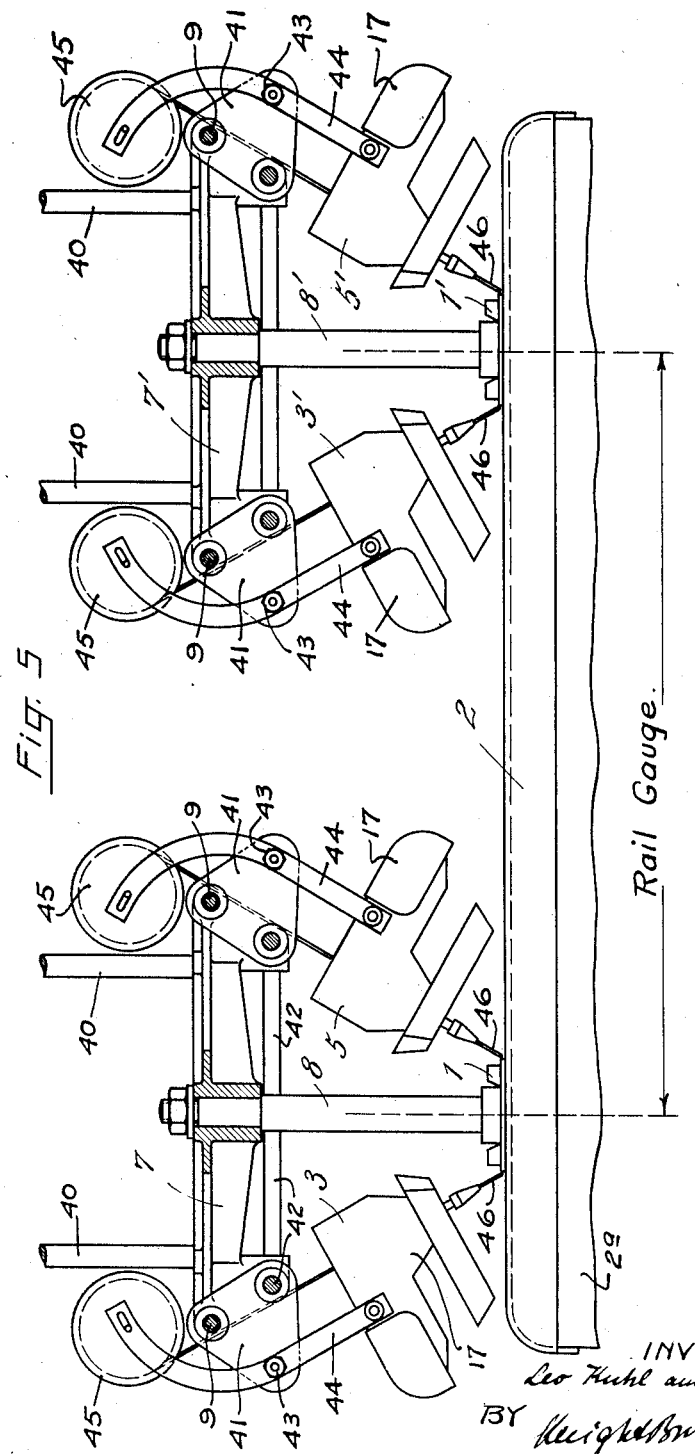

1,732,900

UNITED STATES PATENT OFFICE

LEO KUHL AND CARL RITZ, OF BERLIN-CHARLOTTENBURG, GERMANY, ASSIGNORS TO SIEMENS-SCHUCKERTWERKE GESELLSCHAFT MIT BESCHRÄNKTER HAFTUNG, OF BERLIN-SIEMENSSTADT, GERMANY, A CORPORATION OF GERMANY

APPARATUS FOR WELDING THE TIE-PLATES TO STEEL TIES.

Application filed May 16, 1927, Serial No. 191,760, and in Germany April 13, 1926.

Our invention relates to apparatus for welding the tie-plates to steel ties.

It has been suggested in railroad construction using steel ties to attach the tie-plates for supporting the rails upon the ties by welding them to the steel ties. The construction of railroads, using the tie-plates thus attached, demands annually several millions of individual weldings. To render the process economical it is necessary to reduce the time for carrying out the process to a minimum. This is according to our invention rendered possible by employing a plurality of welding heads by which a plurality or edges of the tie-plate are welded simultaneously to the tie.

For welding such plates to the ties a separate welding head may be employed for each edge of the plate. For moving these welding heads a runway is provided upon which the welding heads are propelled either by means of a common drive or by hand, while the welding proceeds. In both cases the feed of the electrode material preferably takes place automatically. Moving the welding heads along by hand has the advantage, that breakdowns in the control of the welding heads by which the entire welding process is delayed, are avoided, inasmuch as each individual head can be moved along its guide separately by hand. While thus the feed of the electrode wire is withdrawn from the control of the operator, the displacement of the welding head along the welding seam is controlled by the operator as in the customary welding process. The position of the runway of the welding head in relation to the welding seam may be adjustable. As the weight of the welding device proper is supported by the runway or guiding track, the operator has only to overcome the frictional resistances and is thus able to concentrate his entire attention to the production of a good weld.

The displacement of the welding head by means of a handle is, however, unfavorable in so far as according to the resistances encountered along the guide, which may differ in magnitude, the speed of advance will vary and as it is furthermore rather difficult to maintain a uniform motion by hand, as commonly known. In order to provide this possibility in spite of the above, the welding head may be moved by a screw-threaded spindle and a handwheel. It is well known that it is far easier to perform a rotary motion uniformly by hand than a reciprocating motion. A similar effect as with the screw-threaded spindle and handwheel may of course also be produced by a pinion and rack.

The guiding or supporting arrangement for the welding head may furthermore be designed in such a manner, that the welding head is inclined, so that the electrode stands not vertically, but at an angle to the plate to be welded. With such an arrangement a welded seam is obtained in which the welding material is affixed to the two parts to be united with increased reliability.

For improving the welding process a device may, furthermore, be provided which imparts to the welding electrode apart from the motion along the welding seam simultaneously a motion transversely to it so that the arc moves in a sinuous or zig-zag line. This prevents the arc from passing along on the tie only and not passing on to the tie-plate.

The welding operation may be carried out in such a manner that for each edge a special welding head is provided or one head for any two intersecting edges. When two heads are used the tie may be turned round in its fixtures after two parallel seams have been welded, whereupon the two other parallel seams at an angle to the first seam are welded.

In order to avoid this reclamping of the tie the two guides of the welding heads may be adapted to swing around a pivot. The special advantage resulting from this arrangement is that the welding electrode does not become stopped at one point. It is possible to lead the molten welding material slightly past the end of the welding edge proper and then only to turn the guide with the welding head, so that the point of the electrode describes a circle and again has a short run-up path a certain length in front of the beginning of the second welding edge until after welding over the material deposited during the preceding motion it executes the welding of the edge at an angle to it. The guidance of the arc at the corner is determined by the location of the pivot of the guide member. If the run-up path of one seam should be as long as the run-up path of the seam at an angle to it, the pivot must preferably be located at an angle of 45° to the corner of the welding piece. In the desired position of the welding head after the welding of one edge is finished the turning of the entire guide member with the welding head is preferably automatically controlled by means of a stop.

In the drawings affixed hereto two embodiments of our invention are illustrated by way of example.

In these drawings:

Fig. 1 represents a side-elevation of a welding apparatus in which four welding heads are provided for automatically and simultaneously welding the four edges of the tie-plate to the tie, the front and rear head being omitted for clearness sake.

Fig. 2 represents a plan of Fig. 1, showing all four heads.

Fig. 3 represents a partly sectional side-elevation of a modified welding head construction mounted on a pivoted guide member.

Fig. 4 represents a plan of Fig. 3, and

Fig. 5 represents an arrangement for insuring the welding of the two tie-plates the proper rail gauge distance apart.

Like parts are indicated by like numerals of reference in the various figures of the drawings.

Referring to Figs. 1 and 2 of the drawings illustrating an apparatus suitable for welding the tie-plate 1 to the tie 2, it will be observed that four welding heads 3, 4, 5 and 6 are provided which are adapted to be carried along the edges of the tie-plate to be welded. The welding heads are supported by a suitable framing 7 which in turn is suspended from bars 40, one provided near each frame corner. This framing 7 also supports a holding die 8 which engages at its lower end the recessed portion of the tie-plate 1. At the commencement of the welding operation the holding die 8 is first so firmly pressed down on the tie-plate 1 that it makes full contact with the tie 2. This prevents that by subsequent bending of the tie-plate under the action of a train passing over the track strains are set up in the welds which lead to their destruction.

Fig. 2 of the drawings more clearly illustrates the drive of the individual welding heads. The shaft 9 is driven from its end $m$ by a motor, not shown, and this shaft, through bevel gears 10, 11, 12 drives the shafts 13, 14 and 15. Since all four heads are of like construction, the latter will be described with reference to only one head. The driving shaft for each head, for instance 9, is provided with a screw thread, on which runs a carriage which consists of a pair of internally threaded heavy plates 41. This carriage is longitudinally guided also by a guide rod 42, so that it may run in a fixed position. In the example portrayed in Figs. 1 and 2, the edges of the tie-plates are of different length, i. e. the tie-plate is rectangular, not square, so that the spindle pair 9, 14 is shorter than spindle pair 13, 15.

On carriage 41 is suspended by means of a trunnion bolt 43 a pair of arms 44, which carry between their lower ends the welding head, (for instance 3 in Figs. 1 and 2) and between their upper ends the spool 45 from which the welding wire 46 is supplied to the head. This wire may be fed to the place of welding by any suitable means, provided in the head and with which the present invention is not concerned. In Fig. 1 it is merely indicated by a suitably driven feeding mechanism 31. The shape of arms 44 and the weights of the welding head and of the supply spool 45 are dimensioned so that the head is substantially balanced in welding position as shown, so that the operator, if desired, can easily adjust it into any other slightly deviating position.

In view of the rectangular shape of the tie-plates, assumed in the present example, the arrangement may be such that all the welding heads travel at the same speed but that the welding current of the heads 3 and 5, running along the short sides of the tie-plate, is switched in later than that of the heads 6 and 4, and that it is switched off correspondingly earlier. The heads 3 and 5 may, however, also be given a different speed, for instance, by providing spindles 9 and 14 with a different thread pitch as is shown in Fig. 2, so that the working periods of all the heads are equal.

Preferably the welding heads are individually mechanically and electrically controllable in a manner well known in the art.

Referring to the Figures 3 and 4 of the drawings, it is assumed that the steel tie 2 rests upon a movable support 24 by which it is forced against the stationary holding die column 8. 1 is again the plate to be welded to the tie which is here assumed to have a contour similar to that of the holding die. It is further assumed in Fig. 3 that two similarly constructed welding heads are provided arranged opposite each other, so that simultaneously two oppositely disposed seams of the tie-plate are welded. For simplicity sake only one head is completely illustrated in Figs. 3 and 4, the other head being only partly shown in Fig. 3 to indicate its location. Upon the column 8 is fixed for each head a bearing bracket 25 to which is pivotally connected a horizontally rocking arm 26. Rigidly joined to arm 26 is the horizontal guide rail 16 on which runs the carriage 28 which in turn carries the welding head 17. The motion of the welding head is effected by means of the handwheel 18 by way of the worm wheel 19, the spindle 20, the pinion 21 which engages the rack 29 on the guide-rail 16. The swinging arm 26 is rotatably journaled upon the pin 22 and is provided with two stops 23 and 23ª, by means of which the arc through which the arm can swing is limited to 90° in the manner appearing clearly from the drawings. Thus the guide rail with the welding head is moved through a like angle, so that when one seam is finished another one at right angles to it can immediately be started, merely by swinging the head on the pivot pin 22. Similar to the welding heads disclosed in Figs. 1 and 2, the heads 17 in Figs. 3 and 4 are provided with a wire supply spool 45, mounted above the head, 46 representing the welding wire pulled from the spool by the feeding device inside of the head.

The welding operation is carried out in the following manner: Each welding head 17 is first moved along its guide rail 16 (from top downwards in Fig. 4) and welds the longitudinal edge of the plate 1 to the tie 2. When this edge is finished the wire electrode is carried slightly beyond the end of the edge the welding head is swung (counter-clockwise in Fig. 4) on pivot 22 until stop 23 strikes bracket 25 where the head assumes the position indicated in broken lines in Fig. 4. During the turning of the guide-rail the arc at the point of the welding head describes a small circle. After the turning motion is finished the forward feeding of the welding head is continued along the guide rail in the same direction but at right angles to the finished seam. During the turning a substantial metal deposit is formed at the corner overlapping the end of the finished and the beginning of the transverse seam which is welded by the continued motion of the head as just described.

In order to permit the necessary equal spacing of the two rails along the track laid with ties welded according to the present invention, the tie-plates on each tie must be uniformly spaced. This exact spacing of the tie-plates may be obtained in particularly simple manner by employing two separate multiple welding devices arranged with their holding dies a distance apart which corresponds with the spacing of the rails. Fig. 5 shows such an arrangement. In this figure two multiple welding devices, for instance of the type shown in Figs. 1 and 2 are shown, having their respective holding dies 8, 8' spaced apart a distance equal to the rail gauge for which the ties are intended, whereby all ties are always held in the same relation to the devices by the tie supports 2ª common to both devices.

Various modifications and changes may be made without departing from the spirit and the scope of the invention, and we desire, therefore, that only such limitations shall be placed thereon as are imposed by the prior art.

We claim as our invention:

1. In an electric arc welding machine for welding tie-plates to steel ties, a plurality of welding heads for simultaneously welding a plurality of tie-plate edges, means for automatically feeding the electrode wire in each head, a guide member for each head adapted to support the welding head, and means for moving said welding head along its guide member to follow the tie-plate edge to which it is applied.

2. In an electric arc welding machine for welding tie-plates to steel ties, a plurality of welding heads for simultaneously welding a plurality of tie-plate edges, each head having an individual guide track upon which it is moved along the plate edge to which it is applied, a common driving means for moving said heads along their tracks and means for imparting to the individual heads different traveling speeds according to the length of the plate edge to be welded.

3. In an electric arc welding machine for welding tie-plates to steel ties, a plurality of welding heads for simultaneously welding a plurality of plate edges, each head having an individual guide track to guide it along the plate edge to be welded, and means for swinging each track in a plane in parallel to the plane of the tie-plate, to permit the welding head guided by it, to weld a plate edge disposed at an angle to the edge previously welded by it.

4. In an electric arc welding machine for welding tie-plates to steel ties, a plurality of welding heads for simultaneously welding a plurality of plate edges, each head having an individual guide track to guide it along the plate edge to be welded, a bracket for supporting each track and a pivot pin joining said track to said bracket to permit the track to swing in a plane in parallel to the plane of the tie-plate, to permit the welding head guided by the track to weld a plate edge disposed at an angle to the edge previously welded by the head.

5. In an electric arc welding machine for welding rectangular tie-plates to steel ties, two welding heads for simultaneously welding two opposite plate edges, each head having an individual guide track to guide it along the plate edge to be welded, and an arm supporting said track, a supporting bracket for each arm and a pivot pin on said bracket joining the arm to said bracket and being disposed at right angles to the plate plane and being located in a plane bi-secting the angle at which two adjoining plate edges intersect, to permit the track to swing its head in a plane in parallel to the plate plane to permit the welding head, after it has reached the end of one plate edge, to turn at the plate corner and to continue welding the next adjoining plate edge.

6. In an electric arc welding machine for welding rectangular tie-plates to steel ties, two welding heads for simultaneously welding two opposite plate edges, each head having an individual guide track to guide it along the plate edge to be welded, and an arm supporting said track, a supporting bracket for each arm and a pivot pin on said bracket joining the arm to said bracket and being disposed at right angles to the plate plane and being located in a plane bi-secting the angle at which two adjoining plate edges intersect, to permit the track to swing its head in a plane in parallel to the plate plane to permit the welding head, after it has reached the end of one plate edge, to turn at the plate corner and to continue welding the next adjoining plate edge, and a stop on each side of the arm for positioning the direction of travel of the welding head for each plate edge to be welded.

7. In an electric arc welding machine for welding a pair of tie-plates to steel railroad ties at a distance equal to the rail gauge, a pair of welding devices each comprising a plurality of welding heads arranged to travel along the edges of the tie-plate for simultaneously welding a plurality of edges to said tie, a holding die for each welding device for pressing the tie-plate to which it is applied against, the tie during the welding process, and a framing adapted to support said welding heads and said die, the holding dies of said two devices being spaced apart a distance equal to the rail gauge.

In testimony whereof we affix our signatures.

LEO KUHL.
CARL RITZ.